(12) United States Patent
Jalava

(10) Patent No.: US 9,466,246 B1
(45) Date of Patent: Oct. 11, 2016

(54) DISPLAY STACKS WITH INTEGRATED AMBIENT LIGHT SENSORS

(71) Applicant: Amazon Technologies, Inc., Seattle, WA (US)

(72) Inventor: Juho Ilkka Jalava, Salo (FI)

(73) Assignee: Amazon Technologies, Inc., Seattle, WA (US)

( * ) Notice: Subject to any disclaimer, the term of this patent is extended or adjusted under 35 U.S.C. 154(b) by 39 days.

(21) Appl. No.: 14/659,103

(22) Filed: Mar. 16, 2015

(51) Int. Cl.
G09G 5/00 (2006.01)
G09G 3/34 (2006.01)
G06F 3/041 (2006.01)
G06F 1/16 (2006.01)
F21V 8/00 (2006.01)

(52) U.S. Cl.
CPC ............... G09G 3/344 (2013.01); G06F 1/16 (2013.01); G06F 3/0412 (2013.01); G02B 6/0038 (2013.01); G09G 2320/0626 (2013.01); G09G 2360/144 (2013.01)

(58) Field of Classification Search
None
See application file for complete search history.

(56) References Cited

U.S. PATENT DOCUMENTS

| | | | |
|---|---|---|---|
| 5,907,222 A | 5/1999 | Lengyel et al. | |
| 6,215,920 B1 | 4/2001 | Whitehead et al. | |
| 7,352,930 B2 | 4/2008 | Lowles | |
| 7,859,617 B2 | 12/2010 | Kleverman et al. | |
| 8,096,695 B2 * | 1/2012 | Ong ..................... | G01J 1/04 362/253 |
| 8,933,916 B1 * | 1/2015 | Doar .................... | G09G 3/3406 345/207 |
| 2002/0050974 A1 * | 5/2002 | Rai ....................... | G09G 3/3406 345/102 |
| 2005/0151716 A1 | 7/2005 | Lin | |
| 2008/0248837 A1 * | 10/2008 | Kunkel ................ | G09G 3/3406 455/566 |
| 2009/0027921 A1 * | 1/2009 | Chou .................... | G02B 6/0028 362/632 |
| 2009/0096745 A1 | 4/2009 | Sprague et al. | |
| 2009/0115763 A1 | 5/2009 | Inoue | |
| 2010/0149145 A1 | 6/2010 | Van Woudenberg et al. | |
| 2011/0001764 A1 | 1/2011 | Rhodes | |
| 2011/0050719 A1 | 3/2011 | Diefenbaugh et al. | |
| 2011/0074803 A1 | 3/2011 | Kerofsky | |
| 2011/0157108 A1 | 6/2011 | Ishii | |
| 2011/0199671 A1 | 8/2011 | Amundson et al. | |
| 2011/0205397 A1 | 8/2011 | Hahn et al. | |
| 2012/0019152 A1 | 1/2012 | Barnhoefer et al. | |
| 2012/0019492 A1 | 1/2012 | Barnhoefer et al. | |
| 2012/0046947 A1 | 2/2012 | Fleizach | |
| 2012/0127198 A1 | 5/2012 | Gundavarapu | |
| 2012/0182276 A1 | 7/2012 | Kee | |
| 2013/0048837 A1 * | 2/2013 | Pope ..................... | G01J 1/0422 250/214.1 |
| 2013/0161489 A1 | 6/2013 | Gardner | |

* cited by examiner

Primary Examiner — Seokyun Moon
(74) Attorney, Agent, or Firm — Sutherland Asbill & Brennan LLP

(57) ABSTRACT

Systems, methods, and computer-readable media are disclosed for ambient light sensing for electronic displays. In one embodiment, a device may include a light guide with a first surface and a second surface, where the light guide has a first refractive index value. The device may include a light sensor mounted on either the first surface or the second surface, the light sensor positioned such that at least a portion of ambient light incident upon the light guide is directed to a detection window of the light sensor, where the detection window has a second material having a second refractive index value. The device may include an adhesive layer configured to optically couple the light sensor to the light guide, the adhesive layer having a third refractive index value equal to or greater than the first refractive index value and equal to or less than the second refractive index value.

20 Claims, 8 Drawing Sheets

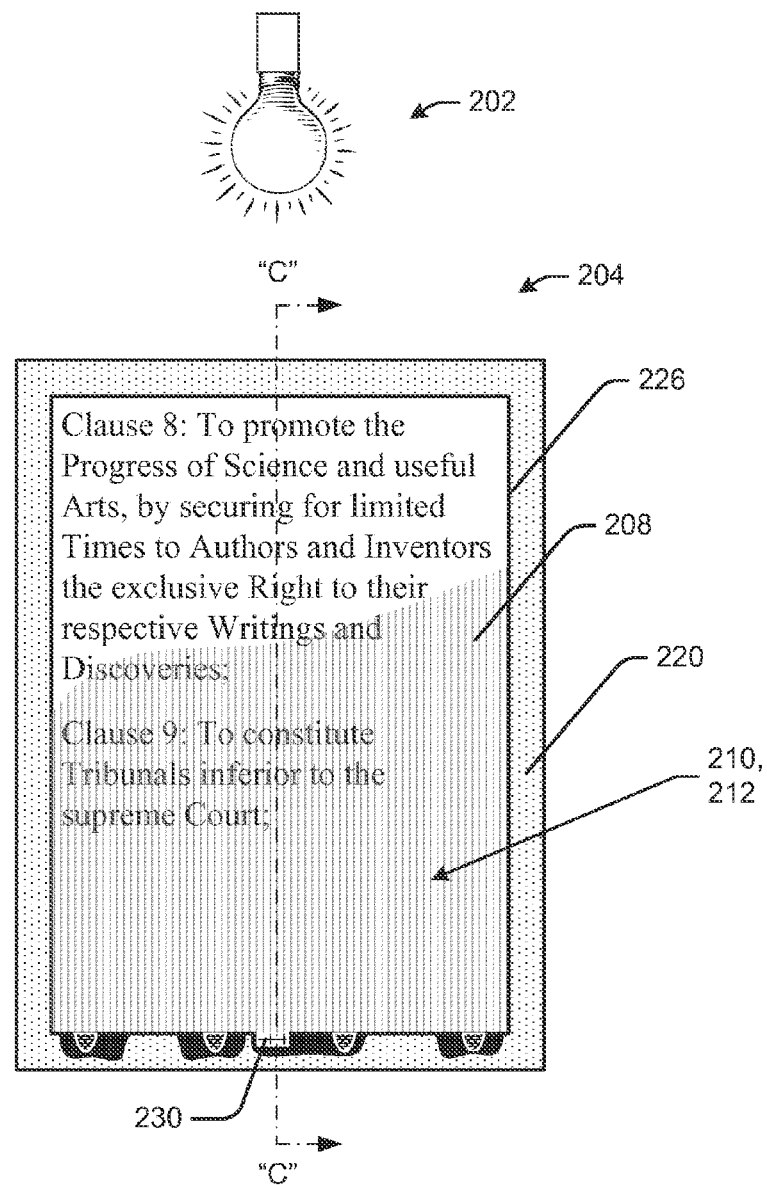
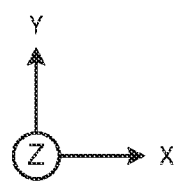
FIG. 2

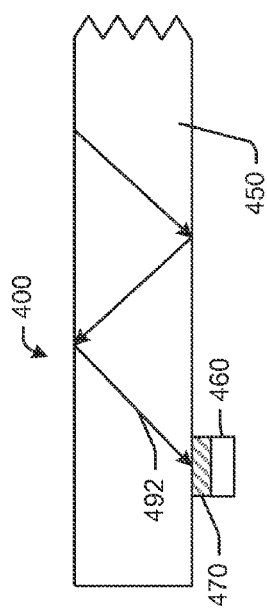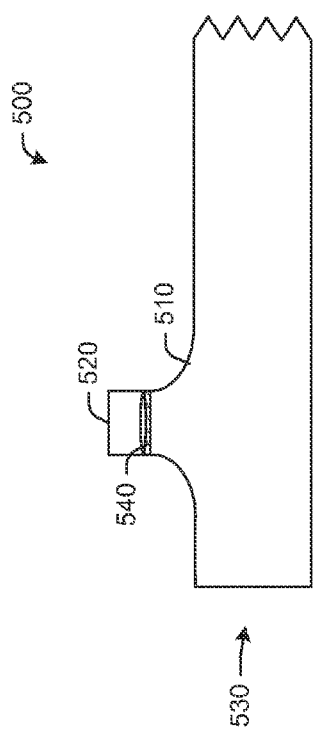

US 9,466,246 B1

DISPLAY STACKS WITH INTEGRATED AMBIENT LIGHT SENSORS

BACKGROUND

A variety of devices, such as electronic book ("e-Book") reader devices, desktop computers, portable computers, smartphones, tablet computers, game consoles, televisions, and so forth are used to access various forms of content. Ambient light sensors may be used in some devices to gather information about ambient light levels. In order to detect ambient light, ambient light sensors may need to be positioned in a particular orientation. Positioning of ambient light sensors may therefore affect accuracy of measurements, manufacturing processes, aesthetic appearances, or other aspects of devices that include ambient light sensors.

BRIEF DESCRIPTION OF THE DRAWINGS

FIG. 2 is a schematic illustration of a device (not to scale) that includes the display stack of FIG. 1 in accordance with one or more embodiments of the disclosure.

FIG. 6 is a schematic illustration of a side view of a light guide and an associated ambient light sensor that depicts ambient light propagating within the light guide in accordance with one or more embodiments of the disclosure.

FIG. 7 is a schematic illustration of a side view of a mounting position for an ambient light sensor of a display stack in accordance with one or more embodiments of the disclosure.

Figure 1:
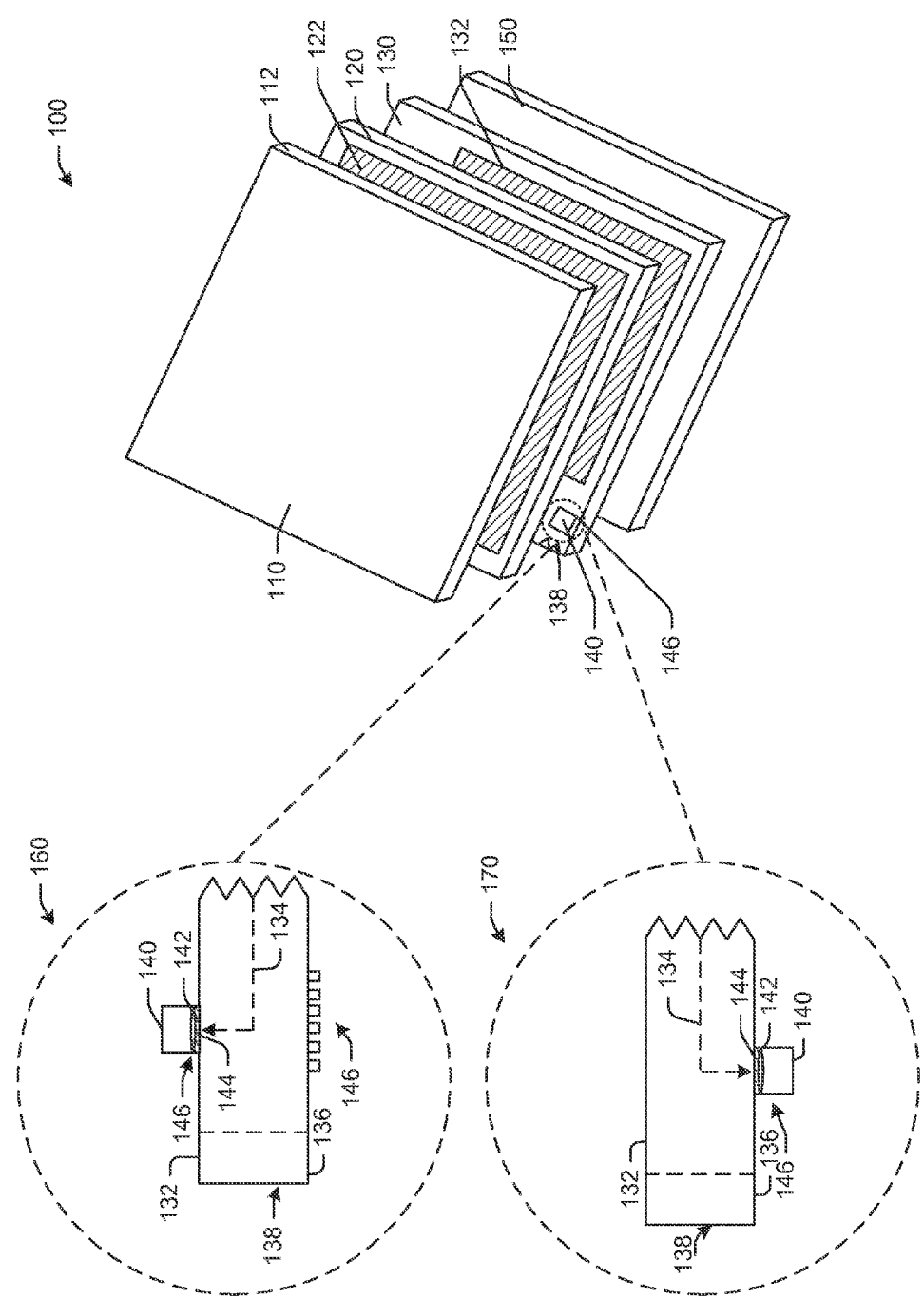
FIG. 1 is a schematic illustration of an exploded view of a display stack with an integrated ambient light sensor in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

This disclosure relates to, among other things, systems, methods, computer-readable media, techniques, and methodologies for detecting ambient light incident upon an electronic device, where a light sensor configured to detect ambient light is positioned on an optical stack or display stack and mounted using an optically clear adhesive. In example embodiments of the disclosure, the light sensor may be positioned and/or mounted such that the light sensor may detect ambient light via coupling to a light guide of the display stack. The light sensors of example display stacks (also referred to as optical stacks) described herein may not be in direct exposure to ambient light, but may detect or otherwise measure ambient light incident upon a device via coupling to the light guide of the display stacks in certain embodiments. Because the light sensor may not need to be directly exposed to ambient light, unpleasant aesthetic effects, such as black holes on faces of white devices, may be avoided or reduced. As a result, structural integrity may be improved due to, for example, a reduction in holes formed in the device. Measurement of ambient light may also be improved due to reduced accidental occlusion of the light sensor by a user, for example. Ambient light detections or measurements may be used by the device to perform certain functions, such as adjusting a display brightness. While example embodiments of the disclosure may be described as including ambient light sensors, the disclosure is more broadly applicable to any form of light sensor.

Example embodiments of the disclosure relate to systems, methods, computer-readable media, techniques, and methodologies for detecting ambient light incident upon or otherwise impinging upon a device, such as an e-reader or other mobile device, by coupling a light sensor to a light guide included in a display stack of the device. A light sensor in accordance with example embodiments of the disclosure may generate accurate ambient light measurements while being positioned entirely internal to a device or otherwise positioned such that the light sensor is not directly exposed to ambient light.

A variety of devices, such as electronic book ("e-Book") reader devices, desktop computers, portable computers, smartphones, tablet computers, televisions, wearable devices, and so forth are used to access various forms of content and other information. Such devices may include displays that are used to present information or content to users. Such displays may be emissive, reflective, or a combination thereof. An emissive display emits light to form an image. Emissive displays include, but are not limited to, backlit liquid crystal displays, organic light emitting diode displays, plasma displays, cathode ray tubes, light-emitting diodes, image projectors, and so forth. Reflective displays use incident light to form an image. Incident light may be provided, for example, by the sun, general illumination in a room or environment, a reading light, a front light, and so forth. Reflective displays include, but are not limited to, electrophoretic displays, interferometric displays, electrowetting, cholesteric displays, and so forth.

Where an illumination source is used, such as in a backlit liquid crystal display ("LCD") or a frontlit electrophoretic display ("EPD"), an intensity of the illumination may be varied based at least in part on the ambient light. For example, in sunlight, a backlight on an LCD may be increased while a frontlight on an EPD may be decreased in the same conditions. Light sensors, or ambient light sensors, may be used to provide information about the intensity of the ambient light which may be used by the device to determine whether certain functions are to be performed, such as varying a display illumination level.

Certain embodiments of the disclosure include display stacks with integrated ambient light sensors. Ambient light sensors may be coupled or otherwise mounted to a light guide panel or related component of the display stacks using an optically clear adhesive, such as a liquid optically clear adhesive. The display stack may include certain components, such as a cover glass, one or more touch layers, one or more adhesive layers, and other components.

Referring to FIG. 1, an example display stack 100 is partially depicted in exploded view in accordance with one or more embodiments of the disclosure. The display stack 100 may include a cover glass 110, a touch layer 120, a light guide panel 130, a light sensor 140 coupled to the light guide panel 130, and a display panel 150. One or more of the layers of the display stack 100 may be joined together or otherwise coupled using one or more adhesives, such as an optically clear adhesive liquid or tape. Other embodiments may include additional or fewer components in a display stack or may have components in different positions. For example, other embodiments may not include the touch layer 120, or may have additional material between the touch layer 120 and the light guide panel 130, or other components.

The cover glass 110 may be formed from glass 112 and may form an outer or outermost layer of the display stack 100. The cover glass 110 may have a uniform or constant thickness or a variable thickness. In some embodiments, the cover glass 110 may form a top most layer of not only the display stack 100, but of the electronic device that includes the display stack 100.

The touch layer 120 may include a resistive and/or capacitive touch sensor and may be formed from any suitable material configured to detect touch input, such as a capacitive layer, an indium tin oxide coating or layer, a conductive layer, or another material. Although a portion of a single touch layer 120 is illustrated, one or more touch layers or components associated with the touch layer 120 may be may be included in, positioned adjacent to, coplanar with, or in another position in the display stack 100. The touch layer 120 may be coupled to or adhered to the cover glass 110 via an adhesive 122 that covers all of or a portion of the touch layer 120.

The display stack 100 includes the light guide panel 130. The light guide panel 130 may include or be formed from one or more materials configured to direct light along a planar surface. In some implementations, the light guide panel 130 may be used to frontlight a reflective display by directing at least a portion of light from one or more illuminators onto a portion of the reflective display. The light guide panel 130 may be coupled to one or more components of the display stack 100 with adhesive 132. The adhesive 132 may be different than the adhesive 122.

The display stack 100 includes the display panel 150. The display panel 150 may be any suitable display panel 150, such as those described herein, including an electrophoretic display, a liquid crystal display, or another type of display panel. The display panel 150 may form a bottom layer, or an outer layer, of the display stack 100.

The display stack 100 includes the light sensor 140 coupled to the light guide panel 130. The light sensor 140 may be any sensor configured to measure and/or detect ambient light, such as an ambient light sensor. The light sensor 140 may be arranged or positioned entirely within a chassis of a device, such that at least a portion of ambient light that impinges on the light guide panel 130 is communicated to the light sensor 140.

The light sensor 140 may be configured to approximate a human eye response to light intensity. The light sensor 140 may be a photodiode configured to convert light into a voltage or current. Ambient light may enter the light sensor 140 through a detection window 142, which may correspond to a top of a photodiode. The light sensor 140 may have any spectral response, such as a spectral response ranging from 350 nm to 1100 nm with peak sensitivity around 880 nm, or from 400 nm to 700 nm with peak sensitivity at 560 nm.

The light sensor 140 may be coupled to the light guide panel 130 via an optically clear adhesive 144. The optically clear adhesive 144 may be positioned in between the detection window 142 of the light sensor 140 and the light guide 130. The optically clear adhesive 144 may have a refractive index value that is less than or equal to the refractive index value of the detection window 142 of the light sensor 140. The optically clear adhesive 144 may have a refractive index value that is greater than or equal to the refractive index value of the light guide panel 130. In some embodiments, the optically clear adhesive 144 may have a refractive index value that is both less than the refractive index value of the detection window 142, or another component of the light sensor 140, and greater than the refractive index value of the light guide panel 130.

A refractive index value of an optical medium, such as the cover glass 112, the detection window 142, or the light guide panel 130 of the display stack 100, is a dimensionless number that indicates how light, or any other radiation, propagates through that specific medium. A refractive index value of a specific medium is defined as $n=c/v$ where c is the speed of light in vacuum and v is the speed of light in the substance. For example, the refractive index value of water is 1.33, meaning that light travels 1.33 times faster in a vacuum than it does in water. Other methods of calculating or measuring refractive index values may be used herein.

The optically clear adhesive 144 that couples the light sensor 140 to the light guide panel 130 may be in liquid or non-liquid form. Liquid optically clear adhesive may be liquid-based and may bind the light guide panel 130 to the light sensor 140. The optically clear adhesive 144 may improve optical characteristics of the device, as well as durability. Liquid optically clear adhesives may be malleable and/or less firm than other adhesives, and may therefore bind to non-even surfaces. Non-liquid optically clear adhesives, such as optically clear adhesive tape, may be used to bind one or more layers of the display stack 100 together. For example, the cover glass 110 may be coupled to the touch layer 120 with optically clear adhesive tape. Optically clear adhesive may be cured via ultraviolet light, heat, moisture, or a combination thereof. Optically clear adhesive may also reduce or eliminate an air gap between components or layers of the display stack 100.

The optically clear adhesive 144 may be formed as a layer in between all or a portion of the light sensor 140 and the light guide panel 130. For example, the optically clear adhesive 144 may cover only the detector window 142 of the light sensor 140, such that ambient light propagating within, or trapped inside, the light guide panel 130 may escape to or otherwise propagate to the light sensor 140.

By coupling the light sensor 140 to the light guide panel 130 with the optically clear adhesive 144 having a specific refractive index value between that of the detector window 142 and the light guide panel 130, light may be prevented from escaping the light guide panel 130 and may propagate to the light sensor 140, facilitating measurement of ambient light by the light sensor 140 without being exposed directly to the ambient light.

For example, in FIG. 1, in a first detailed view 160 of section A of the light guide panel 130, the light sensor 140 may be positioned on a top surface 132 of the light guide panel 130, with the detection window 142 facing the light guide panel 130 instead of the top of the display stack 100 or the ambient environment. Such an arrangement is facilitated by the coupling of the light sensor 140 to the light guide panel 130. Ambient light, illustrated as path 134, may pass through the light guide panel 130 and be measurable by the light sensor 140. In a second detailed view 170, an alternate embodiment illustrating the light sensor 140 coupled to a bottom surface 136 of the light guide panel 130, with the detection window 142 facing the bottom surface 136 of the light guide panel 130. Ambient light, again illustrated as path 134, may similarly pass through the light guide panel 130 and be measureable by the light sensor 140. Although positioned on "top" or "bottom" surfaces in the embodiment illustrated in FIG. 1, the light sensor 130 may be positioned along other surfaces of the light guide panel 130, including diagonal or angled surfaces, middle surfaces, or other surfaces. Also, while illustrated as being positioned in a specific location, or near an edge, of the light guide panel 130, the light sensor 140 may be positioned elsewhere about surfaces of the light guide panel 130.

The light guide panel 130 may include one or more edge features 138, which may be a series of one or more angles forming a "triangular formation" along all or a portion of an edge of the light guide panel 130. The edge features 138 may facilitate directing of ambient light to the light sensor 140, as described herein.

The light guide panel 130 may further include one or more surface features 146. Surface features 146 may include patterning, engraving, or other formation of features on a surface of the light guide panel 130 that affect stray light or light streaking that may be visible to users. The surface features 146 may be positioned in between the light sensor 140 and the surface of the light guide panel 130 upon which the light sensor 140 is mounted. The surface features 146 may include raised portions that extend from a surface of the light guide panel 130. Raised portions may be in the form of rectangles, triangles, prisms, or other formations. In some embodiments, such as the illustration in the first detailed view 160, one or more surface features may be included on the surface of the light guide panel 130 opposite the surface upon which the light sensor 140 is mounted. In detailed view 160, while the light sensor 140 is mounted on the top surface 132, one or more surface features 146 may be included in between the light sensor 140 and the light guide panel 130, and/or on the opposite surface, or bottom surface 136 of the light guide panel 130. Some embodiments may include surface features 146 on both the surface upon which the light sensor 140 is mounted, as well as a portion of the opposing surface. In such embodiments, the surface features may be the same, or may be different. For example, the top surface may have cylindrical surface features while the bottom surface may have rectangular surfaces. In some embodiments, surface features 146 may cover a portion of the light guide panel surface that is about 3 times or 4 times the size of the detection window of the light sensor 140. The area of the light guide panel 130 surface local to the light sensor 140 may more effectively redirect ambient light via the surface features 146. Other examples of surface features include blazed grating type patterns and standard prismatic type patterns. The surface features 146 may redirect ambient light so as to turn the ambient light 90 degrees, in some embodiments.

Stray light may be light emitted from the display panel 150 of the display stack 100 that does not reflect from a display surface of the device in which the display stack 100 is included. Coupling patterns or surface features 146 of the light guide panel 130 of the display stack 100 may be arranged such that light emitted from the display panel 150 is propagated to the display surface at high efficiency and with minimal loss. Stray light may include polarized light reflected from pattern elements or surface features 146 upwards to the display window of the device. In one example, the refractive index difference between a light guide formed of polycarbonate material, where n=1.59 and an acrylic optically clear adhesive, where n=1.48, may be relatively low, or about 0.11. The same light guide, however, in air having a refractive index value of n=1 has a relatively high index difference of 0.59. Reflection power may decrease with decreasing refractive index differences, which may result in a front light display stack having significantly less stray light than a non-laminated light guide on top of a display.

Light streaking is a typical stray light pattern that may be visible to users as streaks of light that appear significantly brighter in a bare light guide compared to a laminated light guide. In a laminated light guide, light streaking may be faintly visible, if visible at all, when an electrophoretic display is black. Light streaking may be formed or caused by angular mapping of pixels, for example, where pixels in one row are facing two directions at a fifty percent split.

With the configuration illustrated in FIG. 1, the light guide panel 130 acts to collect ambient light from a significantly larger area than a single aperture included in devices for which a light sensor must be exposed directly to ambient light. As a result, measurement of the actual ambient light level is improved by reducing the likelihood or severity of occlusion by the user or an accessory. Furthermore, no penetrations for the ambient light sensor are required, improving the functionality and aesthetics of the device.

Accordingly, the systems, methods, computer-readable media, techniques, and methodologies described herein may detect ambient light with a light sensor coupled to a light guide panel. In some embodiments, the light sensor may be positioned on a top or bottom surface, as defined herein, of the light guide panel. The light guide panel may have edges formed so as to facilitate propagation of light from the light guide panel to the light sensor. Surface features may reduce light streaking or stray light visible to users. Although discussed herein in the context of e-readers, the systems, methods, and apparatuses of the disclosure may be applicable to other electronic devices.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings. The techniques are described below with reference to the following devices and processes. However, a number of other devices may also employ these techniques. While FIG. 1 illustrates one example display stack, multiple other forms of display stacks, devices, and architectures may be included in other embodiments.

ILLUSTRATIVE EMBODIMENTS AND PROCESSES

FIG. 2 illustrates an example environment 200 which may include ambient light 202 and a device 204 in accordance with one or more embodiments of the disclosure. FIGS. 3-7 and 8A-8B illustrate portions of the device 204 in detail and will be discussed in conjunction with the environment 200 of FIG. 2. The device 204 may comprise an electronic book ("e-Book") reader device, a computer display, a portable computer, a smartphone, a tablet computer, a game console, a television, an in-vehicle display, and so forth. For clarity of illustration, the figures in this disclosure are not depicted to scale. For ease of description, three axes orthogonal to one another are shown, designated as X, Y, and Z.

The ambient light 202, when present, may be provided by artificial lighting such as a light bulb, by natural lighting such as the sun, or a combination. The ambient light 202 may be provided by a point source such as the sun or other highly localized source, or a diffuse source such as a cloudy sky. The ambient light may comprise photons in infrared wavelengths, visible wavelengths, ultraviolet wavelengths, or a combination thereof.

The device 204 may include a display window 206 through which users may view a display 208 of the device 204. The device 204 may include a display stack 210 as described herein, such as display stack 100. The display stack 210 of the device 204 may include a cover glass layer 212 made of glass. The cover glass layer 212 may form an outermost layer of the display stack 210 of the device 204. The device 204 may include a chassis 220 that houses some or all components of the device 204 and the display stack 210. As shown in the partial cutaway view of FIG. 2, the device 204 may include a light sensor 230, such as an ambient light sensor or the light sensor 140 of FIG. 1.

The ambient light 202 may impinge on at least a portion of the device 204. The device 204 may include the display 208 which may be configured to present visual information to a user. The display 208 may be emissive or reflective. An emissive display emits light to form an image. Emissive displays include, but are not limited to, backlit liquid crystal displays, plasma displays, cathode ray tubes, light-emitting diodes, image projectors, and so forth. Reflective displays use incident light to form an image. This incident light may be provided by the sun, general illumination in the room, a reading light, a frontlight, and so forth. Reflective displays include electro-optical displays such as electrophoretic displays, cholesteric displays, electrowetting, and so forth, as well as interferometric and other displays. For example, the electrophoretic displays may comprise an electrophoretic material configured such that when electricity is applied an image may be formed. The display 208 may be configured to present images in monochrome, color, or both. In some implementations, the display may use emissive, reflective, or combination displays with emissive and reflective elements.

Figure 3:
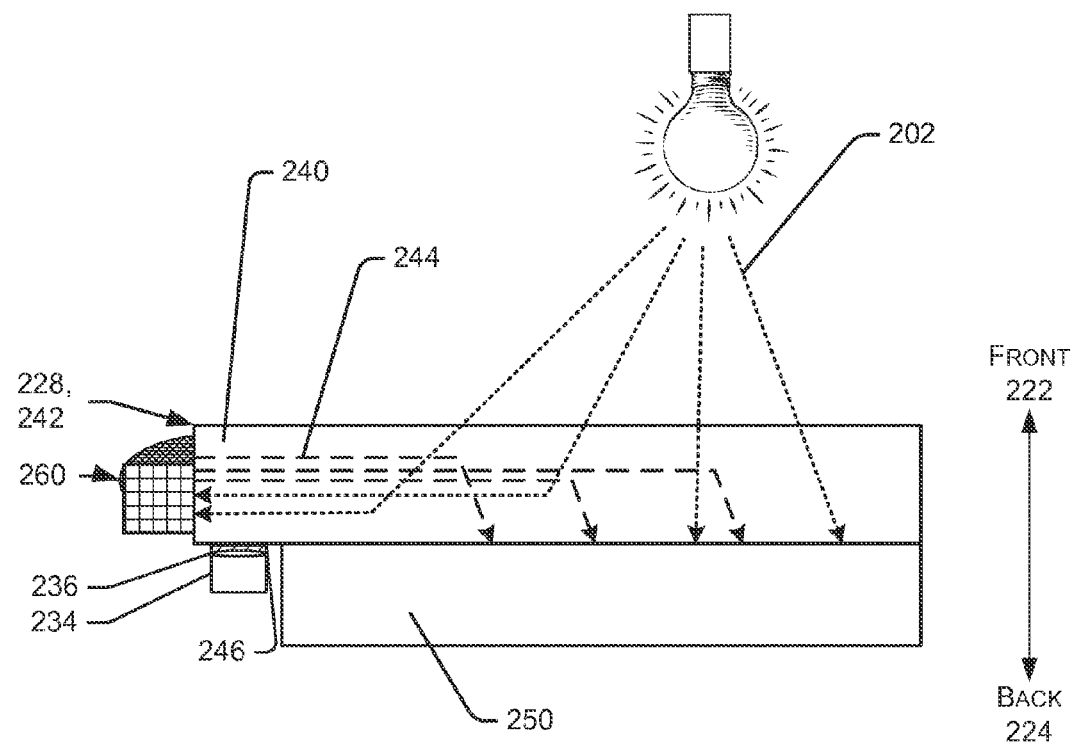
FIG. 3 is a schematic illustration of a cross sectional view along line "C" of the device of FIG. 2 in accordance with one or more embodiments of the disclosure.

Referring to FIG. 3, a partial cross-sectional side view along line "C" of the device 204 is depicted. In FIG. 3, a "front" 222 side and a "back" side 224 of the device 204 is identified. The front side 222 may be the side of the device 204 that includes the display 208 or where users are presented content or information. The back side 224 may be a side opposite the front side 222. The front side 222 may be considered a "top" side or surface, and the back side 224 may be considered a "bottom" side or surface, as determined by a positioning or orientation of the device 204. In the partial cross sectional view of FIG. 3, light guide panel 240 is arranged in front of a display panel 250. The light guide panel 240 may be substantially planar and may be formed of one or more materials such as plastic, glass, aerogel, metal, ceramic, and so forth. The light guide panel 240 may be laminated to the display panel 250. Around a perimeter 226 of the light guide panel 240 (shown in FIG. 2) are one or more edges, such as edge 228 in FIG. 3. The edge 228 is depicted in FIG. 3 as being planar and generally perpendicular to the plane of the light guide panel 240. However, in other implementations, the edge 228 may be concave, convex, tapered, or have other shapes.

The light guide panel 240 may be configured with one or more surface features 242 on a surface thereof, or embedded within, which are configured to direct light along predetermined paths. The surface features 242 may be diffractive, refractive, reflective, and so forth. The surface features 242 may include diffusers, grooves, grating, dimples, lenses, planar surfaces, concave surfaces, convex surfaces, and so forth, may be used to enhance or attenuate the transmission of light. In some implementations, optical features may be internal to the light guide panel 240 instead of, or in addition to, surface features 242. For example, regions with materials of differing indices of refraction may be used to form internal features to direct light within the light guide panel 240 or to interface points such as proximate to the one or more illuminators 260, lights sensors 230, the front of the display panel 250, and so forth.

In some implementations where the display panel 250 comprises a reflective display, the light guide panel 240 may be optically coupled to the one or more illuminators 260 and may be configured to distribute at least a portion of light emitted from one or more illuminators 260 to the front side 222 or front surface of the display panel 250. In some implementations the illuminators 260 may be configured to provide backlighting to the display panel 250. The illuminators 260 are shown here in a cutaway view of the interior of the chassis 220 to provide front lighting to the display panel 250.

The one or more illuminators 260 may be configured to emit light when activated. The light emitted may comprise photons in infrared wavelengths, visible wavelengths, ultraviolet wavelengths, or a combination thereof. Each illuminator 260 may comprise one or more light-emitting diodes ("LED"), cold cathode fluorescent lamp ("CCFL"), electroluminescent materials, sonoluminescent materials, fluorescent lights, incandescent lights, or a combination thereof. In some implementations, different types of illuminators 260 may be used in the same device 204. For example, electroluminescent lights may be used in conjunction with LEDs. The one or more illuminators 260 may be arranged along one or more edges of the perimeter 226 of the light guide panel 240. The one or more illuminators 260 may be adjacent to and may be optically coupled to the light guide panel 240 such that light emitted from the one or more illuminators 260 is distributed to at least a portion of the display panel 250.

The optical coupling between the light guide panel 240 and the one or more illuminators 260 may include one or more of physical proximity, an air gap, an adhesive, a mechanical interface, and so forth. In some implementations, one or more surface features may be provided on the illuminator 110. These surface features, such as diffusers, grooves, grating, dimples, lenses, planar surfaces, concave surfaces, convex surfaces, and so forth, may be used to enhance or attenuate the transmission of light between the one or more illuminators 260 and the light guide panel 240. In some implementations, these surface features may be separate or discrete elements which have been coupled to the light guide panel 240. For example, a microlens array may be adhered to the light guide panel 240 to aid the optical coupling with an illuminator 260.

The illuminator 260 is shown optically coupled to one of the edges 228 of the light guide panel 240. In one implementation, the illuminator 260 may comprise a side-firing light emitting diode, with an emission side abutting the edge 228. The light guide panel 240 is configured to distribute at least a portion of emitted light 244 (with illustrative rays shown here with dashed lines) from the one or more illuminators 260 to the front side 252 of the display panel 250. This distribution of emitted light 244 serves to frontlight or illuminate the display panel 250 and the image presented thereon.

The one or more light sensors 230 are configured to detect a flux of incident photons, such as those directed by the light guide panel 240, and provide a signal indicative of that flux. The incident photons may comprise photons in infrared, visible, or ultraviolet wavelengths, or a combination thereof. The light sensor 230 may comprise a photocell, a phototransistor, a photoresistor, photodiodes, reverse-biased LED, and so forth. In some implementations, at least a portion of the one or more illuminators 260 may be used as a light sensor. For example, where the illuminator 260 comprises an LED, it may be reverse-biased to generate a signal indicative of incident photons. The light sensor 230 may comprise an analog, digital, or mixed analog-digital device. The one or more light sensors 230 may be configured to detect one or more of visible light, infrared, or ultraviolet. In some implementations, different types of light sensors 230 may be used on the same device 204. For example, one light sensor 230 sensitive to near infrared may be used as well as another light sensor 230 sensitive to visible light.

The light sensor 230 is also shown optically coupled to the light guide panel 240 such that at least a portion of ambient light 202 (with rays shown here with dotted lines) incident upon the light guide panel 240 is directed to the one or more light sensors 230. The light sensor 230 is optically coupled to the light guide panel 240 with an optically clear adhesive layer 232 having a refractive index value in between a refractive index value of the light guide panel 240 and a detector window 234 of the light sensor 230. In some implementations the light sensor 230 may comprise a diffusive material, such as a milky or translucent material, in the optical path. Although light sensors 230 are illustrated as positioned on the front side 222 and the back side 224 of the light guide panel 240, some embodiments may include a single light sensor 230 positioned on any surface of the light guide panel 240. The light sensor 230 may be positioned on any surface with a detection window facing in any direction such that the light sensor 230 receives ambient light propagating through the light guide panel 240. In this illustration, the light sensor 230 is proximate to the one or more illuminators 260 near the same edge 228 of the light guide panel 240. Interaction between the ambient light 202 and the emitted light 244 while propagating within the light guide panel 240 is minimal, such that the rays do not interfere with one another to a substantial degree. While in FIG. 2 the illuminators 260 and the light sensor 230 are on a same edge of the light guide panel 240, in other embodiments the illuminators and the light sensor may be positioned elsewhere.

One or more surface features 246 on the light guide panel 240 may be provided at an interface of the optical coupling between the light guide panel 240 and the one or more light sensors 230. The surface features 246 may provide for light out-coupling points or light in-coupling points. Light out-coupling points are designed to facilitate light to be passed from the light guide panel 240 to the light sensor 230, whereas light in-coupling points are designed to allow light to be passed from the one or more illuminators 260 to the light guide panel 240. In some implementations, a light in-coupling point and a light out-coupling point may be combined into a common structure. Surface features 246 may comprise one or more of a diffuser, groove, grating, dimple, lens, planar surface, concave surface, or convex surface. Surface features 246 may be embossed, impressed, etched, and so forth. Surface features 246 may be separate or discrete elements which have been coupled to the light guide panel 240.

Figure 4:
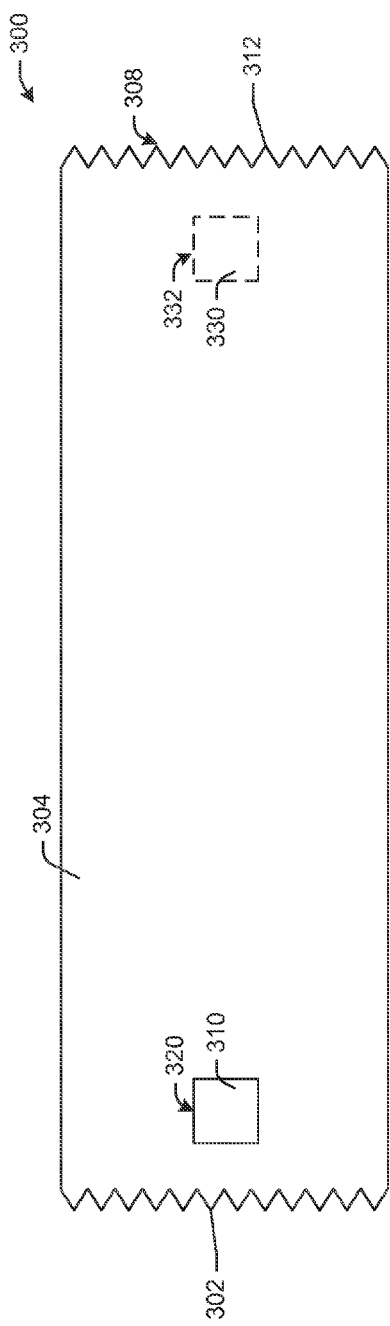
FIG. 4 is a schematic illustration of a top view of a light guide panel with an integrated ambient light sensor in accordance with one or more embodiments of the disclosure.

The positioning and placement of the one or more light sensors 230 is described below in more detail with regard to FIGS. 4-7. Referring now to FIG. 4, a top view of a light guide panel 300 in accordance with one or more embodiments is illustrated. In FIG. 4, the light guide panel 300 may have a first triangular edge 302, or angled surfaces forming edge 302, with a first light sensor 310 positioned adjacently. The first light sensor 310 may be coupled to a top surface 304 of the light guide panel 300 with an optically clear adhesive 320 having a refractive index value in between that of the light guide panel 300 and a detector window or other component of the first light sensor 310. In addition to the first light sensor 310, or instead of the first light sensor 310, a second light sensor 330 may be coupled to a bottom surface 308 adjacent to a second triangular edge 312. The second light sensor 330 may also be coupled to the light guide panel 300 with an optically clear adhesive 332 having a refractive index value in between that of the light guide panel 300 and a detector window or other component of the first light sensor 330. The shaped edges 302, 312 may facilitate propagation of ambient light through the light guide panel 300 to the respective light sensor 310, 330. Although illustrated as having opposite edges with shaped features, shaped edges may be at adjacent edges in some embodiments and some embodiments may include planar or flat edges instead of shaped edges.

Figure 5:
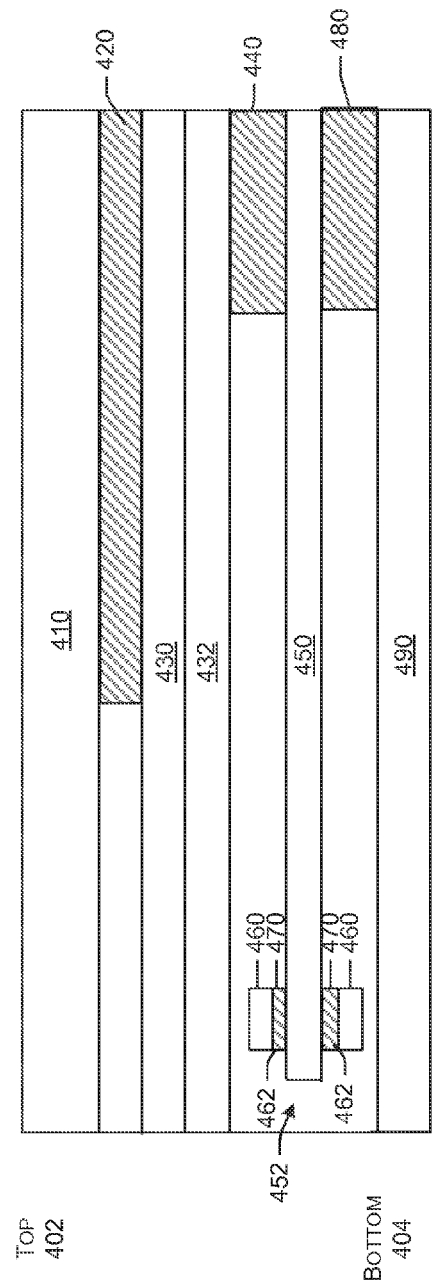
FIG. 5 is a schematic illustration of a cross-sectional side view of the display stack of FIG. 4 in accordance with one or more embodiments of the disclosure.

Referring now to FIG. 5, another embodiment of a display stack 400 in accordance with one or more embodiments of the disclosure is depicted. The display stack 400 includes a cover glass layer 410 formed of a glass at a top position 402. Although referred to as "top" and "bottom" in FIG. 5, the orientation of the display stack 400 may affect whether any layer is a top or bottom or positioning with respect to other components in the display stack 400.

In some embodiments, such as the illustration of FIG. 5, the display stack 400 may include one or more touch layers, such as a first touch layer 430 and a second touch layer 432. The first and second touch layers 430, 432 may be coupled underneath or adjacent to a bottom or lower surface of the cover glass layer 410 with an adhesive layer 420. The adhesive layer 420 may be a liquid or solid adhesive. The first and second touch layers 430, 432 may be positioned elsewhere within the display stack 400.

The display stack 400 includes a light guide panel 450 that may be coupled to, for example, the second touch layer 432 with adhesive layer 440. The light guide panel 450 may be formed of material having a first refractive index value. Adhesive layer 440 may be formed from any suitable adhesive. In some embodiments, the light guide panel 450 may be optically coupled to the cover glass layer 410, and may include a first surface, such as a top surface aligned with or parallel to the cover glass layer 410. The light guide panel 450 may include a second surface opposite the first surface and a third surface forming an edge of the light guide panel 450. For example, a third surface 452 may form an edge of the light guide panel 450 and may be perpendicular to the top and bottom surfaces of the light guide panel 450. In other embodiments, the third surface of the light guide panel 450 may be transverse to the first surface and the second surface. The third surface may include a plurality of angled surfaces configured to form a triangular edge arrangement that directs ambient light from the light guide panel 450 to a light sensor. The light guide panel 450 may include a surface feature on at least a portion of the light guide panel 450 to provide for the optical coupling between the light guide panel 450 and a light sensor. The surface features on the light guide panel 450 may be positioned at an interface of optical coupling between the light guide panel 450 and a light sensor.

The display stack 400 may include a display panel 490 optically coupled to the light guide panel 450 via an adhesive layer 480. The display panel 490 may be an electrophoretic display panel, an emissive display, or another display.

The display stack 400 includes a light sensor 460 coupled to the light guide panel 450 with an optically clear adhesive layer 470 having a refractive index value in between that of the light guide panel 450 and the light sensor 460. Specifically, the adhesive layer 470 that optically couples the light sensor 460 to the light guide 450 may have a third refractive index value equal to or greater than the first refractive index value and equal to or less than the second refractive index value. The light sensor 460 may be positioned on a top or bottom surface of the light guide panel 450. The light sensor 460 may be positioned such that at least a portion of ambient light incident upon the light guide panel is directed to the light sensor 460, and may include a detection window 462 having a second refractive index value that is different than the first refractive index value of the light guide panel 450. The light sensor 460 may be positioned such that the light sensor 460 measures only light from the light guide panel 450 and does not receive any light from any other source, such as direct ambient light.

Referring now to FIG. 6, the display stack 400 is depicted with ambient light following path 492 through the light guide panel 450 of the display stack 400. The ambient light 492 may be trapped within the light guide panel 450 until impinging upon the optically clear adhesive layer 470, which may facilitate passing or escaping of the ambient light from the light guide panel 450 to the light sensor 460 for measurement.

In FIG. 7, some embodiments of the display stacks of the disclosure may include mounting points or mounting surfaces on light guide panels to enhance light transmission between the light guide panel and light sensors mounted on the mounting point. For example, in FIG. 7, a light guide panel 500 may have a mounting point 510 with a light sensor 520 mounted thereon via an optically clear adhesive layer 540. The optically clear adhesive layer 540 may have a refractive index value in between, or equal to, refractive index values of the light guide panel 500 and a component of the light sensor 520. The mounting point 510 may be positioned on any surface, such as the top surface or the bottom surface, of the light guide panel 500. The mounting point 510 may be positioned adjacent to an edge 530 of the light guide panel 500. The edge 530 may have the angled triangular feature described above or another feature configured to further facilitate light transmission from the light guide panel 500 to the light sensor 520. The mounting point 510 may form a raised portion on a second surface of the light guide panel 500.

Figure 8A:
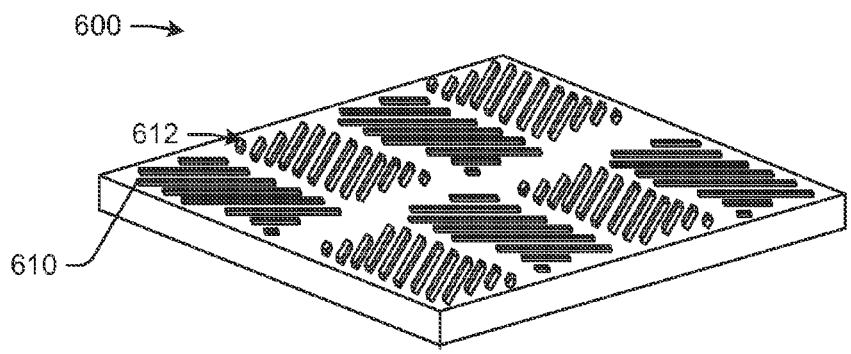
FIGS. 8A and 8B are schematic illustrations of example light guide patterns in accordance with one or more embodiments of the disclosure.
Figure 8B:
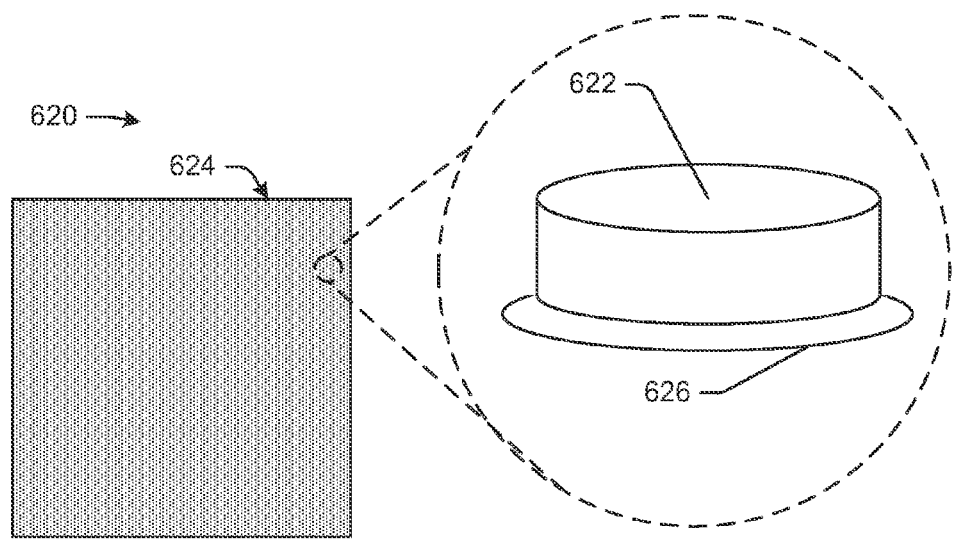

Referring now to FIGS. 8A and 8B, an example first surface feature 600 is illustrated in FIG. 8A and an example second surface feature 620 is illustrated in FIG. 8B. The surface features 600, 620 may be positioned on a surface of a light guide panel of display stacks as described herein. The first surface feature 600 may include a series of identical or different sized parallel raised rectangular or box-like portions 610 forming angled patterns 612. The second surface feature 620 may include a series of raised circular or cylindrical portions 622 spread across all of or a portion of a surface of the light guide panel, for example, forming a desired pattern. The cylindrical portions 622 may extend from a rounded base 626 and may have varying or different radii.

Figure 9:
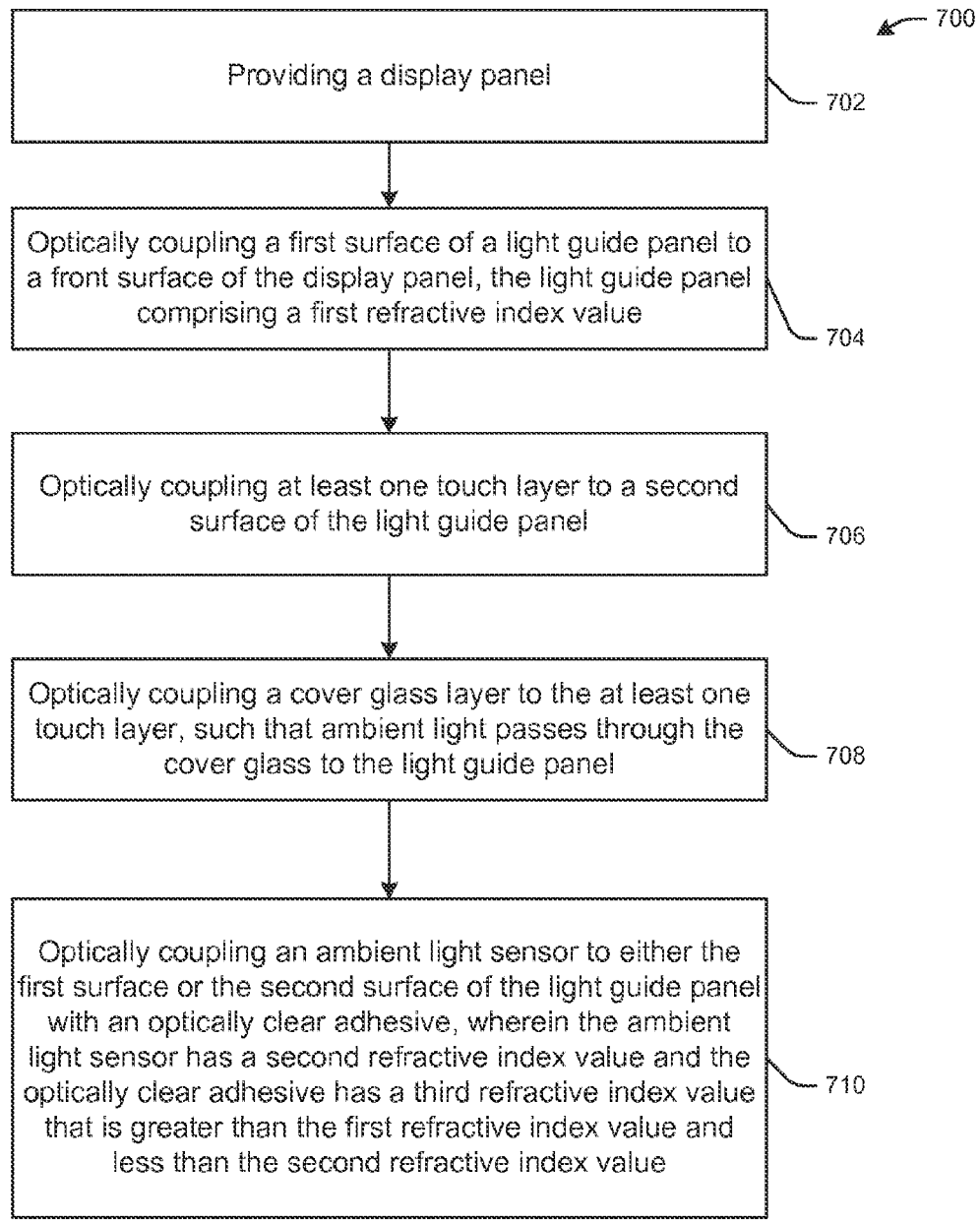
FIG. 9 is an example process flow in accordance with one or more example embodiments of the disclosure.

FIG. 9 illustrates a flow diagram of a process 700 of manufacturing a display stack as described herein. The following operations may be performed by manual, automated, or combined automated and manual operations.

At block 702, the process 700 includes providing a display panel. Block 704 includes optically coupling a first surface of a light guide panel to a front surface of the display panel, the light guide panel comprising a first refractive index value. Block 706 includes optically coupling at least one touch layer to a second surface of the light guide panel. Block 708 includes optically coupling a cover glass layer to the at least one touch layer, such that ambient light passes through the cover glass to the light guide panel. Block 710 includes optically coupling an ambient light sensor to either the first surface or the second surface of the light guide panel with an optically clear adhesive, wherein the ambient light sensor has a second refractive index value and the optically clear adhesive has a third refractive index value that is greater than the first refractive index value and less than the second refractive index value.

In other embodiments, process 700 may include forming an edge of the light guide panel with a plurality of angled surfaces configured to form a triangular arrangement that directs ambient light from the light guide panel to the ambient light sensor. Process 700 may also include forming a surface feature on at least a portion of the light guide panel to provide for the optical coupling between the light guide panel and the ambient light sensor, the surface feature comprising one or more of a diffuser, groove, grating, dimple, lens, planar surface, concave surface, or convex surface. Process 700 may also include mounting one or more illuminators to the light guide panel, wherein the light guide panel is configured to distribute at least a portion of light emitted from one or more illuminators to the front side of the display panel.

It should be noted, that the process 700 may be modified in various ways in accordance with certain embodiments of the disclosure. For example, one or more operations of process 700 may be eliminated or executed out of the illustrated order in other embodiments of the disclosure. Additionally, other operations may be added to process 700 in accordance with other embodiments of the disclosure.

Figure 10:
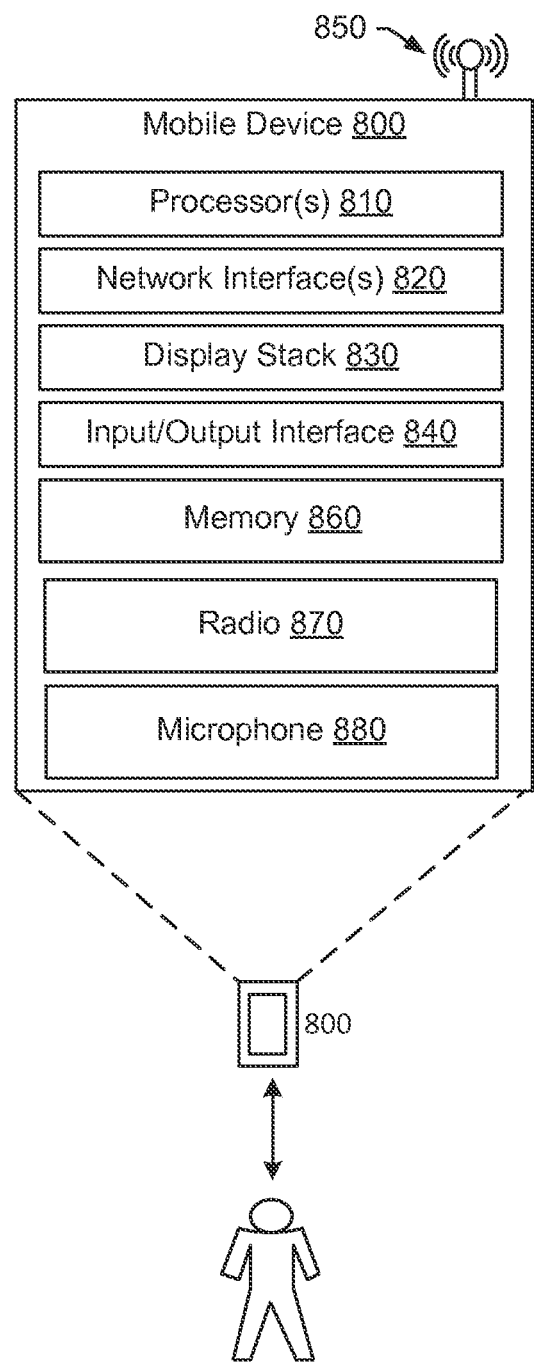
FIG. 10 is a schematic illustration of an example mobile device with an optical stack in accordance with one or more example embodiments of the disclosure.

FIG. 10 is a schematic depiction of example components of a mobile device 800 with an optical or display stack as described herein. The mobile device 800 may be any suitable user device including, but not limited to, a mobile device such as a smartphone, a tablet, an e-reader, or the like; a desktop computer; a laptop computer, a game console, a personal media player, and so forth. The mobile device 800 may present user interfaces and may receive input from users, such as voice commands.

In an illustrative configuration, the mobile device 800 may include one or more processor(s) 810, one or more network interface(s) 820, one or more display stacks 830, one or more input/output ("I/O") interface(s) 840, one or more antennas 850, and one or more memory devices 860 (hereinafter referred to as "memory 860"). The mobile device 800 may also include various additional components, such as one or more input/output device(s) configured to interact with the I/O interface 840 to allow a user to provide input to and/or receive output from the mobile device 800. The mobile device 800 may also include an operating system configured to provide an interface between software and hardware resources of the mobile device 800, and/or database management systems configured to support functionality for storing and retrieving data in one or more datastores (which may include the memory 860). The mobile device 800 may further include system buses that functionally couple various components of the mobile device 800. In other embodiments, the mobile device 800 may include additional or fewer components.

The processor(s) 810 may be configured to access the memory 860 and execute computer-executable instructions loaded therein. For example, the processor(s) 810 may be configured to execute computer-executable instructions of the various program modules of the mobile device 800 to cause or facilitate various operations to be performed in accordance with one or more embodiments of the disclosure. The processor(s) 810 may include any suitable processing unit capable of accepting data as input, processing the input data in accordance with stored computer-executable instructions, and generating output data. The processor(s) 810 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 810 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 810 may be capable of supporting any of a variety of instruction sets.

The network interface(s) 820 may be configured to allow the mobile device 800 to communicate with content providers and other entities over networks, such as local-area networks (LANs), wide-area networks (WANs), the Internet, wireless networks, wireless wide-area networks (WWANs), cable television networks, telephone networks, cellular communications networks, combinations of the foregoing, and/or the like. Further, such networks may have any suitable communication range associated therewith and may include, for example, metropolitan area networks (MANs) or personal area networks (PANs). In addition, such networks may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The display stack 830 may comprise any component as described herein, such as a cover glass, a cover glass layer, a plastic cover layer, a plastic frame with anti-glare coating, a plastic frame, one or more touch layers, a light guide panel, a display panel, liquid or tape optically clear adhesives, amongst other components.

One or more input/output (I/O) interfaces 820 may be provided that may facilitate the receipt of input information by the mobile device 800 from one or more I/O devices as well as the output of information from the mobile device 800 to the one or more I/O devices. The I/O devices may include, for example, one or more user interface devices that facilitate interaction between a user and the mobile device 800 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The mobile device 800 may include one or more antennas 850 capable of receiving and transmitting signals in accordance with any suitable communications protocol(s). Non-limiting examples of suitable antennas may include directional antennas, non-directional antennas, dipole antennas, folded dipole antennas, patch antennas, multiple-input multiple-output (MIMO) antennas, or the like. The antenna 850 may be communicatively coupled to one or more transceivers or radio components 870 to which or from which signals may be transmitted or received. The antenna 850 of the mobile device 800 may include, without limitation, a cellular antenna for transmitting or receiving signals to/from a cellular network infrastructure, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), 5G standards, direct satellite communications, or the like. Other example antennas 850 include a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth.

The antenna 850 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antenna 850 may be configured to transmit or receive radio frequency signals within any suitable frequency range forming part of the unlicensed portion of the radio spectrum.

The mobile device 800 may further include a radio 870 for, in cooperation with the antenna 126, transmitting or receiving radio frequency (RF) signals in the bandwidth and/or channels corresponding to the communications protocols utilized by the mobile device 800 to communicate with other devices. The radio/transceiver 870 may include hardware, software, and/or firmware for modulating, transmitting, or receiving, potentially in cooperation with any of antenna(s) 850, communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The radio 870 may include any known receiver and baseband suitable for communicating via the communications protocols utilized by the mobile device 800.

The memory 860 may include one or more program modules, applications, or the like. Any of the modules may include one or more sub-modules. The memory 860 of the mobile device 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory. The memory 860 may include removable and/or non-removable media which may be implemented in any method or technology for storage of information, such as computer-readable instructions, data structures, program modules, or other data.

In various implementations, the memory 860 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 860 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.). Other examples of memory include EEPROM, flash memory, CD-ROM, digital versatile disks (DVD) or other optical storage, magnetic cassettes, magnetic tape, magnetic disk storage, or other magnetic storage devices, RAID storage systems, or any other medium which can be used to store the desired information and which can be accessed by a computing device.

The mobile device 800 may optionally include a microphone 880. The microphone 880 may be configured to generate signals based at least in part on incident or ambient sounds. The signals generated by the microphone may be analog signals. The microphone 880 may be configured to receive voice input in the form of analog sound input and may generate electrical signals indicative of the analog sound which may be converted to digital data using an ADC. Although each of these components is shown in the illustrated embodiment, other embodiments may include additional or fewer components.

The display stacks described herein may result in accurate sensing of ambient light by light sensors positioned without direct exposure to ambient light. The display stacks may further facilitate positioning of light sensors away from circuit boards or other components of a device, which may increase performance of the device, reduce a physical size of the device, or increase durability and structural integrity of the device by removing a need to make a hole in the device to provide direct exposure to ambient light to the light sensor.

Although specific embodiments of the disclosure have been described, one of ordinary skill in the art will recognize that numerous other modifications and alternative embodiments are within the scope of the disclosure. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A display stack, comprising:
    a cover glass comprising a top surface exposed to an ambient environment and an opposing bottom surface;
    a touch layer adhered to the bottom surface of the cover glass;
    a light guide optically coupled to the touch layer, the light guide comprising a first surface parallel to the cover glass, a second surface opposing the first surface, and a third edge surface perpendicular to the first surface and the second surface, wherein the light guide comprises a first material having a first refractive index value;
    an ambient light sensor optically coupled to the first surface, the ambient light sensor comprising a detection window positioned such that at least a portion of ambient light incident upon the light guide is directed to the ambient light sensor, wherein the detection window comprises a second material having a second refractive index value greater than the first refractive index value;

an optically clear adhesive layer positioned in between the detection window and the light guide, the optically clear adhesive layer having a third refractive index value that is between the first refractive index value and the second refractive index value; and an electrophoretic display panel optically coupled to the light guide.

2. The display stack of claim 1, wherein the third edge surface comprises a plurality of angled surfaces having a triangular edge arrangement that directs ambient light from the light guide to the first surface of the light guide.

3. The display stack of claim 1, further comprising a surface feature on a portion of the second surface opposite the ambient light sensor to provide for the optical coupling between the light guide and the ambient light sensor, the surface feature comprising a plurality of raised protrusions extending from the second surface.

4. The display stack of claim 1, further comprising one or more illuminators optically coupled to the third edge surface of the light guide, the light guide configured to distribute at least a portion of light emitted from one or more illuminators to a front side of the electrophoretic display panel.

5. A device comprising:
a light guide comprising a first surface and a second surface opposite the first surface, wherein the light guide comprises a first refractive index value;
a light sensor mounted on either the first surface or the second surface, the light sensor positioned such that at least a portion of ambient light incident upon the light guide is directed to a detection window of the light sensor, wherein the detection window comprises a second material having a second refractive index value;
an adhesive layer configured to optically couple the light sensor to the light guide, the adhesive layer comprising a third refractive index value equal to or greater than the first refractive index value and equal to or less than the second refractive index value; and
a display panel optically coupled to the light guide and positioned substantially parallel to the first surface.

6. The device of claim 5, further comprising a cover glass layer optically coupled to the first surface of the light guide and positioned substantially parallel to the first surface.

7. The device of claim 5, further comprising a plastic layer with an anti-reflective coating coupled to the first surface of the light guide and positioned substantially parallel to the first surface, the anti-reflective coating configured to facilitate light transmission through the plastic layer.

8. The device of claim 5, further comprises one or more illuminators optically coupled to the third surface, wherein the light guide is configured to distribute at least a portion of light emitted from one or more illuminators to a front side of the display panel.

9. The device of claim 6, wherein the light sensor is mounted on either the first surface or the second surface adjacent to the one or more illuminators.

10. The device of claim 5, wherein the light guide further comprises a third surface that is transverse to the first surface and the second surface and wherein the third surface comprises a plurality of angled surfaces forming a triangular edge arrangement that directs ambient light from the light guide to the light guide.

11. The device of claim 5, further comprising at least one touch layer adhered to the first surface or the second surface of the light guide.

12. The device of claim 5, further comprising one or more surface features at a first portion of the light guide in between the light guide and the light sensor on the first surface, the one or more surface features comprising one or more of a diffuser, groove, grating, dimple, lens, planar surface, concave surface, or convex surface;
wherein the light sensor is mounted on the first surface of the light guide.

13. The device of claim 12, wherein the one or more surface features comprise raised protrusions extending from the light guide and the adhesive layer extends in between the raised protrusions.

14. The device of claim 12, further comprising one or more surface features at a second portion of the light guide on the second surface of the light guide opposite the first portion on the first portion of the light guide.

15. The device of claim 5, wherein the light sensor is mounted adjacent to an edge of the first surface.

16. The device of claim 5, further comprising a mounting surface that forms a raised portion on either the first surface or the second surface of the light guide, and the light sensor is mounted on the mounting surface.

17. A method of forming a display stack for an electronic device comprising:
providing a display panel;
optically coupling a first surface of a light guide to a front surface of the display panel, the light guide having a first refractive index value;
optically coupling a touch layer to a second surface of the light guide;
optically coupling a cover glass layer to the touch layer, such that ambient light passes through the cover glass to the light guide; and
optically coupling an ambient light sensor to the second surface of the light guide with an optically clear adhesive, wherein the ambient light sensor comprises a material with a second refractive index value and the optically clear adhesive has a third refractive index value that is greater than the first refractive index value and less than the second refractive index value.

18. The method of claim 17, further comprising forming a plurality of adjacent angled surfaces configured to form a triangular edge of the light guide that directs ambient light from the light guide to the ambient light sensor.

19. The method of claim 17, further comprising forming a surface feature on at least a portion of the light guide to provide for the optical coupling between the light guide and the ambient light sensor, the surface feature comprising one or more of a diffuser, groove, grating, dimple, lens, planar surface, concave surface, or convex surface.

20. The method of claim 17, further comprising mounting one or more illuminators to the light guide, wherein the light guide is configured to distribute at least a portion of light emitted from one or more illuminators to the front side of the display panel.

* * * * *